United States Patent [19]

Cohen et al.

[11] Patent Number: 5,511,017
[45] Date of Patent: Apr. 23, 1996

[54] REDUCED-MODULUS ADDRESS GENERATION USING SIGN-EXTENSION AND CORRECTION

[75] Inventors: Earl T. Cohen, Fremont; James S. Blomgren, San Jose, both of Calif.

[73] Assignee: Exponential Technology, Inc., San Jose, Calif.

[21] Appl. No.: 252,579

[22] Filed: Jun. 1, 1994

(Under 37 CFR 1.47)

[51] Int. Cl.$^6$ .................................. G06F 7/38; G06F 7/50
[52] U.S. Cl. ............................................. 364/746; 364/786
[58] Field of Search ................................... 364/736, 746, 364/768, 784, 786, 787

[56] References Cited

U.S. PATENT DOCUMENTS

| | | | |
|---|---|---|---|
| 4,598,266 | 7/1996 | Bernardson | 364/746 X |
| 4,722,067 | 1/1988 | Williams | 364/746 |
| 4,742,479 | 5/1988 | Kloker et al. | 364/746 |
| 4,935,867 | 6/1990 | Wang et al. | 364/746 X |
| 5,233,553 | 8/1993 | Shak et al. | 364/746 |
| 5,249,148 | 9/1993 | Catherwood et al. | 364/746 |
| 5,381,360 | 1/1995 | Schridhar et al. | 364/746 |

*Primary Examiner*—Roy N. Envall, Jr.
*Assistant Examiner*—Chuong D. Ngo
*Attorney, Agent, or Firm*—Stuart T. Auvinen

[57] ABSTRACT

A mixed-modulo address generation unit has several inputs, preferably three. The unit can effectively add together a subset of these inputs in a reduced modulus, and simultaneously add this partial sum to a full-width input using a full modulus, the full modulus being greater than the reduced modulus. Reduced-width address components, such as 16-bit components with a 32-bit adder, are applied to the subset of inputs. The mixed modulo address generation unit sign-extends to 32-bits one input that includes a sign bit, the input being in the subset of inputs. Each input in the subset of inputs is applied to a carry-generate unit which signals if the partial sum is equal to or exceeds the reduced modulus. Under normal conditions, the full-modulus sum from the adder is output as a linear address. However, if the carry-generate unit signals a carry-out, and the sign bit indicates a positive number, then the full-modulus sum is recirculated to one of the adder's inputs and a correction term, equal to the two's complement of the reduced modulus, is added to produce the linear address. If the carry generate unit does not signal a carry-out, but the sign bit indicates a negative number, then the full-modulus sum is recirculated to one of the adder's inputs and a correction term, equal to the reduced modulus, is added to produce the linear address.

22 Claims, 7 Drawing Sheets

REDUCED-MODULUS ADDRESS GENERATION USING SIGN-EXTENSION AND CORRECTION

BACKGROUND OF THE INVENTION—FIELD OF THE INVENTION

This invention relates to digital computing, and more particularly to address generation in a computer's processor.

BACKGROUND OF THE INVENTION—DESCRIPTION OF THE RELATED ART

Computer architectures for the commercial marketplace are often required to execute code written for an earlier-generation central processing unit (CPU). One popular commercial architecture is the x86 architecture embodied in CPU's manufactured by Intel Corporation of Santa Clara, Calif., and others. Earlier x86 CPU's, such as the 8086, supported address generation from 16-bit address components, while more recent members of the x86 architecture, such as the 386 and 486 CPU's, generate addresses from 32-bit components. However, older code written for the 8086 must also be executable on the newer CPU's. Thus newer CPU's must support address generation from both 16-bit and 32-bit address components. In the x86 architecture, 32 bits is the full modulus while 16 bits is the reduced modulus. Thus the x86 architecture is a mixed-modulus architecture.

FIG. 1 illustrates address generation in a prior-art x86 CPU. An adder 10 adds together a first address component 12, designated "X", and a second address component 14, designated "Y". Both address components 12 and 14 are 16-bits wide. Adder 10 is a 16-bit adder producing a 16-bit result 18. Result 18 is known in the x86 architecture as the effective address. Any carry-out 16 from the most-significant bit in adder 10 is ignored. Thus addresses above $2^{16}$ (64K) wrap around to address zero.

The 16-bit effective address 18 is added to a 32-bit address of a segment base 22 in a 32-bit adder 20. The adder 20 outputs a 32-bit linear address 24. Thus the X and Y address components 12, 14 are added modulo 64K, while this result 18 is added to the segment base 22 in modulo 4G. Result 18 is zero-extended from 16 bits to 32 bits before being input to 32-bit adder 20. K refers to $2^{10}$ or 1024, while G refers to $2^{30}$. The 16-bit adder 10 may be extended to 32-bits so that 32-bit address components may be added; however, the adder 10 must be capable of a 16-bit, modulo-64K add to support older code requiring 16-bit address generation.

The address generate unit of FIG. 1 suffers from having to perform two full adds in series when generating addresses. A three-port adder can be employed to reduce the address generate unit to a single stage. However, additional logic is required to ensure that 16-bit address components are added modulo 64K and not with a full 32-bit, modulo-4G addition.

FIG. 2 shows the approach taken in U.S. Pat. No. 5,233,553 issued to Shak, Decker and Blomgren and assigned to Chips and Technologies, Inc. of San Jose, Calif. A separate 2-port adder 30 is used to generate the effective address 18, which is not normally used, and to determine if the result is greater than 64K, indicating that a modulo-64K address wrap-around has occurred. The carry-out 16 from the 16th bit position in 2-port adder 30 is used to signal that the sum of address components 12, 14 is greater than 64K. A three-port adder is composed of a 3-port carry-save adder 32 and a 2-port full adder 34. The full adder 34 propagates the carries from each bit-position, while the carry-save adder 32 merely outputs the carry results and does not propagate carries. The two 16-bit address components 12, 14 are zero-extended to 32-bits and inputted to the carry-save adder 32, as is the 32-bit segment base 22. The intermediate sums and carries 38S, 38C from carry-save adder 32 are input to the full adder 34, which generates the sum of the three inputs 12, 14, 22. The sum is the linear address 24.

When a carry-out 16 from bit position 16 is signaled from the 2-port adder 30, combinatorial logic 36 acts to modify an intermediate carry in the full adder 34, thus emulating the modulo-64K address wrap.

While the 3-port adder of FIG. 2 has reduced delays relative to the two adders 10, 20 in series of FIG. 1, a second 2-port adder 30 is still required, adding expense and complexity. Modifying an intermediate carry within the 3-port adder is cumbersome and slows down the adder by the inclusion of the additional combinatorial logic 36. What is desired is an address generate unit that can account for the modulo-64K addition of address components 12, 14 without inserting additional delay into the critical path because of combinatorial logic 36 for carry-modification, and without requiring an additional full adder.

SUMMARY OF THE INVENTION

A mixed-modulo address generation unit supports address generation from both reduced-modulus 16-bit and full-modulus 32-bit address components. The unit uses a standard 3-port adder which adds all inputs together in the full modulus. However, a correction term may be added to the sum to account for some address components that must be added together in the reduced modulus. Thus a standard adder may be used and the correction term added in only when needed.

When required, the correction term is added to the uncorrected sum during an additional subsequent step. The mixed-modulo address generation unit adds together an unsigned reduced-width address component and a signed reduced-width address component in a reduced modulus, while adding a full-width address component in a full modulus. The signed reduced-width address component has a sign bit indicating if the signed reduced-width address component represents a positive or a negative number.

The address generate unit comprises a sign-extend means, which receives the signed reduced-width address component, and extends the signed reduced-width address component to the full width by copying the sign bit to upper bit-positions in the full width. The upper bit-positions are those bit-positions not present in the reduced width. The sign-extend means outputs an extended address component having the full width.

The address generate unit also has a multi-port adder, which receives as inputs the unsigned reduced-width address component, the extended address component, and the full-width address component. The multi-port adder calculates the full-modulus sum of the inputs received. Recirculating means receives the full-modulus sum from the multi-port adder, and returns the full-modulus sum to one of the inputs of the multi-port adder for use in a possible subsequent calculation step.

A reduced-modulus carry generator receives the unsigned reduced-width address component and the signed reduced-width address component. The reduced-modulus carry generator produces a reduced-modulus carry-out if reduced-modulus addition of the unsigned reduced-width address component and the signed reduced-width address component would produce a carry-out.

A correction term input means is responsive to the reduced-modulus carry-out and the sign bit. If required, the correction term is input to the multi-port adder during a possible subsequent step and added to the full-modulus sum from the recirculating means. The correction term adjusts the full-modulus sum for the effect of the sign extension and addition of the reduced-modulus address components.

Thus full-modulus addition can be performed on reduced-width address components by sign-extension and possible addition of the correction term during the subsequent step when signaled by the reduced-modulus carry-out and the sign bit.

DETAILED DESCRIPTION

Figure 1:
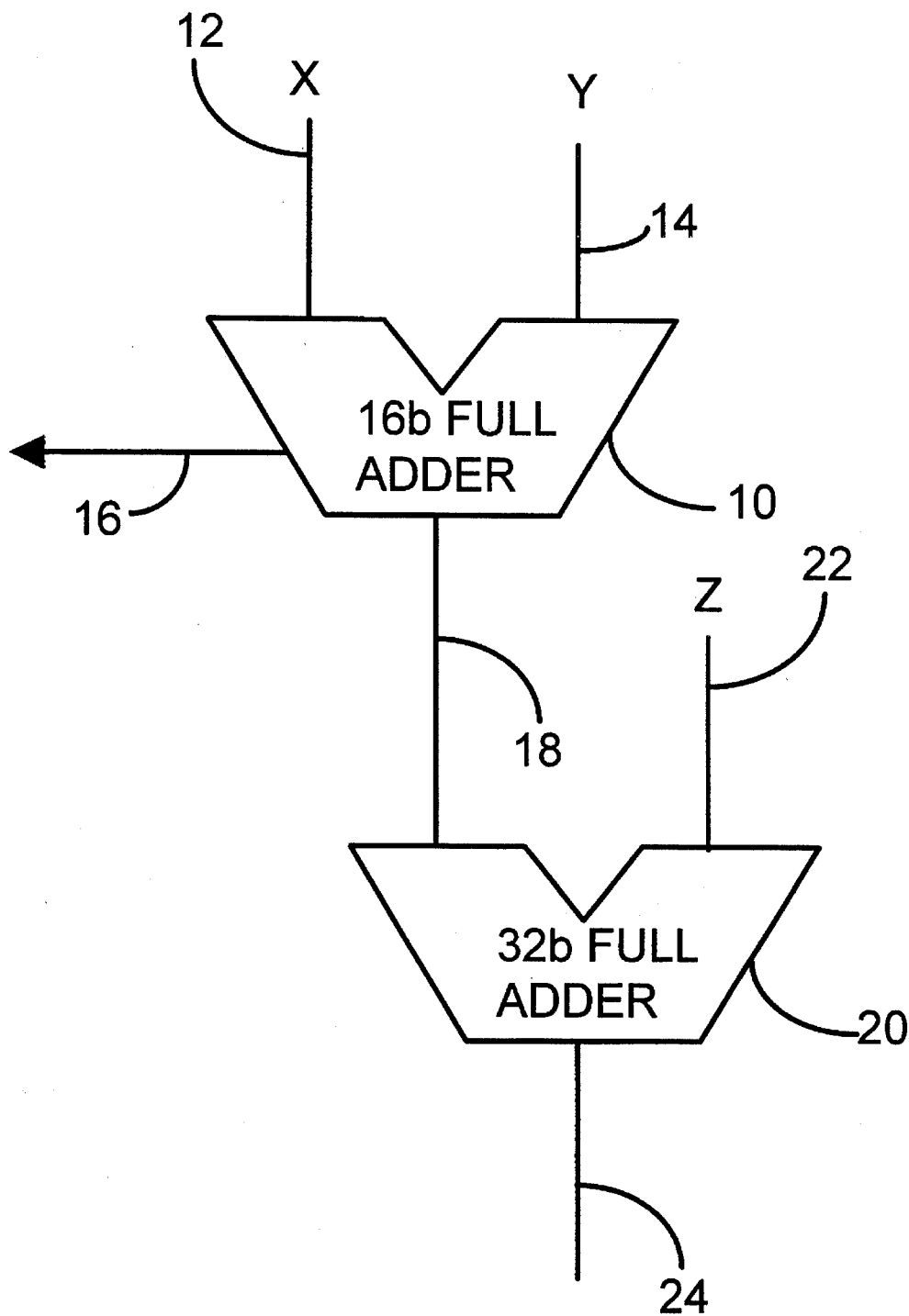
FIG. 1 is a prior-art x86 address generate unit having a 16-bit adder and a separate 32-bit adder.
Figure 2:
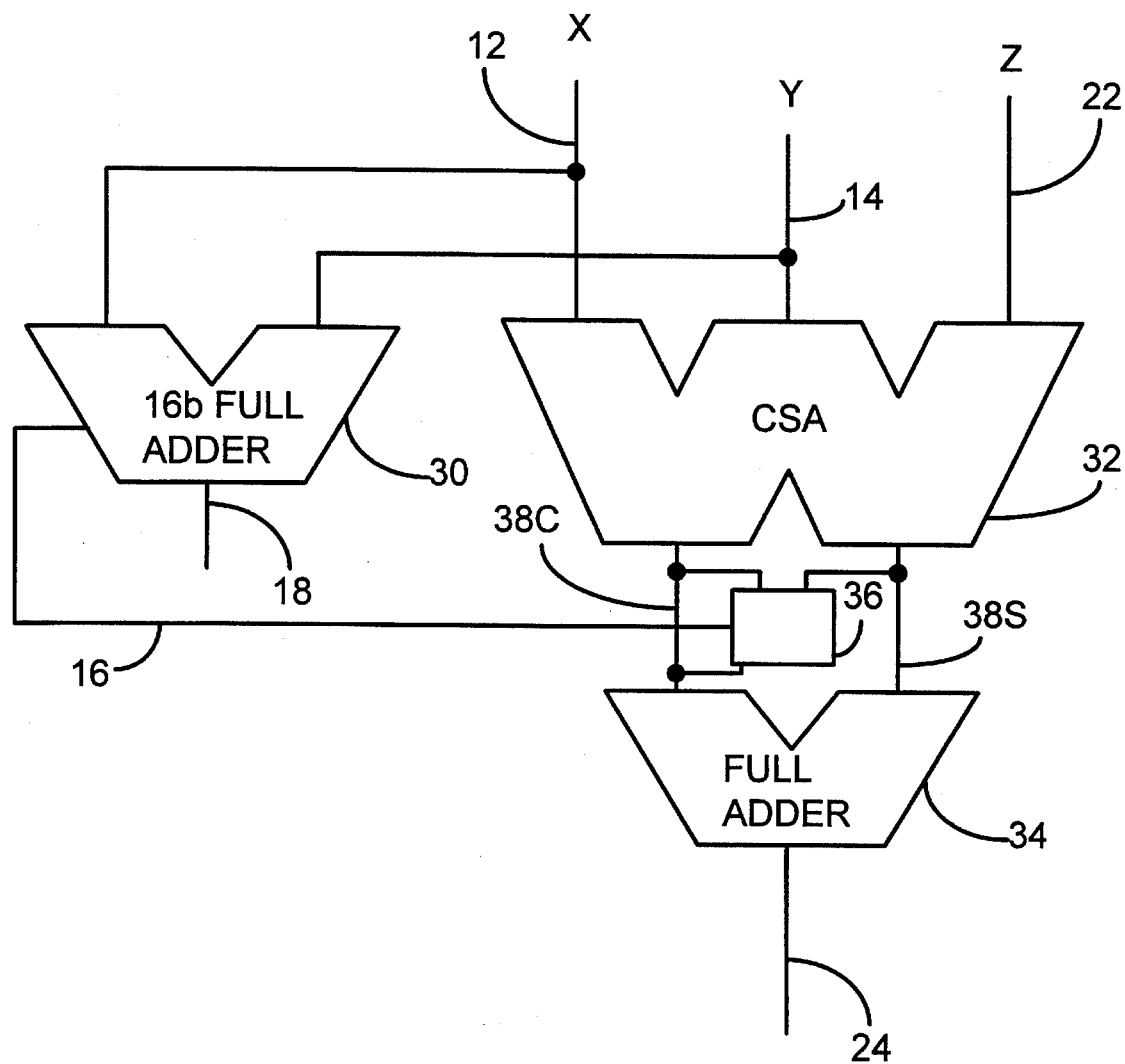
FIG. 2 is a prior-art address generate unit with modification of an intermediate carry within a 3-port adder for modulo arithmetic.

The present invention relates to an improvement in address generation. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

OVERVIEW OF THE INVENTION

Computers compatible the x86 architecture must be able to execute older 16-bit code and newer 32-bit code. Address generation may require that several address components be added together. However, 16-bit components must be added together in a 16-bit modulus, in which the range of numbers representable is $2^{16}$ or 64K. An address wrap-around occurs when two numbers are added together and their sum is equal to or exceeds the modulus. Thus if the modulus is 64K, then 60K+5K will wrap around to address 1K rather than to address 65K, because 65K is outside of the address range of the modulus. Negative numbers are represented in two's complement format, where the largest numbers are used to represent negative values. For example, the number −5 may be represented in two's complement by the number 64K−5. When −5 is added to 6, although the decimal result, 1, does not exceed the modulus, the result of adding the two's complement, 64K−5, to 6 does exceed the modulus, because the result is 64K−5+6, or 64K+1. Thus the sum of an unsigned component and a signed component represented in two's complement may be equal to or exceed the reduced modulus when both components are treated as positive numbers.

Address components having a reduced width, such as 16 bits, should be added together in a 16-bit adder, which will cause the address components to be added in modulo 64K. However, the x86 architecture requires that the 16-bit result then be zero-extended and added to a 32-bit segment base address in the full modulus, $2^{32}$, or modulo 4G, which occurs in a 32-bit adder.

The present invention adds all types of address components, both 32-bit and 16-bit, in a single 32-bit adder. The 32-bit adder can be a standard 3-port adder without any modification for reduced-modulus address generation. If an unexpected address wrap-around should occur in the partial sum of the 16-bit address components, then the 32-bit sum from the 32-bit adder is an incorrect sum and must be corrected. A correction term is added to the 32-bit incorrect sum in a subsequent step in the same 32-bit adder by recirculating the incorrect sum back to one of the inputs to the adder, and then adding the correction term to get the proper sum that accounts for the 16-bit address wrap-around.

In prior-art systems a full 2-port adder was used to determine if an address wraparound occurred. The sum of the 16-bit address components was also calculated by the 2-port adder. In the present invention a high-speed look-ahead carry generator and propagator is used to quickly determine if a carry-out will occur when adding the 16-bit address components. A reduced-modulus carry-out signal for the 16-bit add is thus rapidly generated. The sum of the 16-bit address components is not needed and not generated, making the carry-generate logic simpler and faster.

However, the reduced-modulus carry-out for the 16-bit add does not in itself determine if a correction is needed. A sign-extension is performed on one of the 16-bit inputs to the 32-bit adder. The sign-extension of a positive 16-bit address component will have no effect on the sum. Thus positive numbers will require the correction term when the reduced-modulus carry-out is signaled.

However, sign-extension of a negative 16-bit number to 32 bits "adds"[in 16 binary one's, from bit-position 17 to bit-position 32. These 16 binary one's are equivalent to the number −64K. Thus an additional term of −64K is added in by the sign-extension operation when a negative 16-bit number is sign-extended to 32 bits. If a reduced-modulus carry-out is signaled, the negative sign-extension operation itself supplies the proper correction term, and no further correction is needed. Negative numbers will require an explicit correction term only when the reduced-modulus carry-out is not signaled.

Thus the invention sign-extends one of the 16-bit address components and calculates the 32-bit sum, and then applies a correction term if needed in a subsequent step. There is no performance penalty except in the rare times that a 16-bit correction is necessary. Note that the correction term is needed only when the 16-bit address components have generated an arithmetic overflow, when their sum cannot be accurately represented in 16 bits. In practice, overflow of the 16-bit address components is indeed rare, usually the result of a programming error or obscure programming practices. Thus, this invention is an advantage over the prior art, which adds additional logic into the critical speed path of the adder to account for the address wrap-around, slowing down address computations.

DESCRIPTION OF THE HARDWARE

Figure 3:
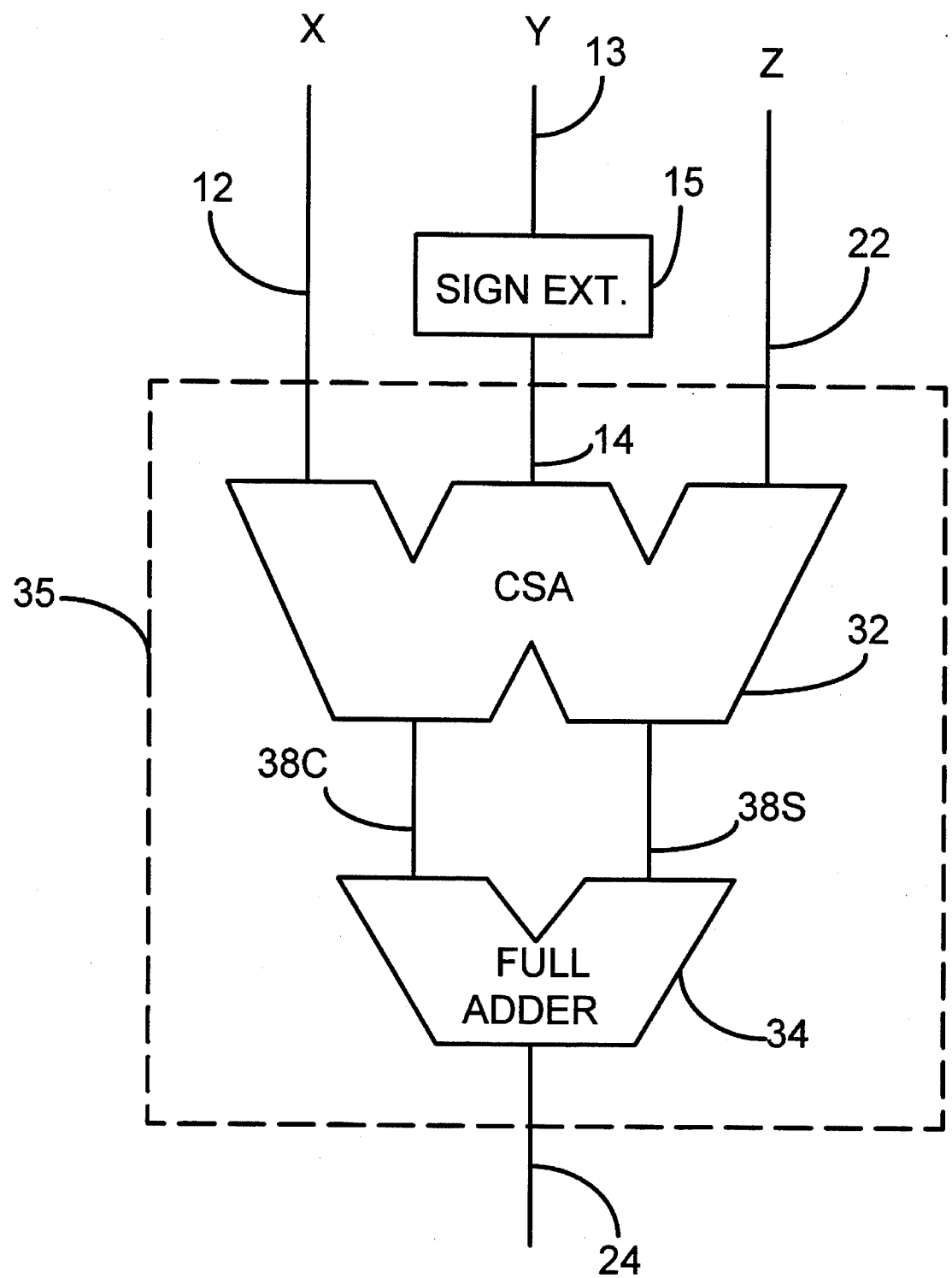
FIG. 3 shows a standard 3-port adder with sign-extension of one input.

FIG. 3 shows a standard 3-port adder 35 used in the present invention. The 3-port adder may be constructed from standard adder cells. The 3-port adder first reduces the three inputs 12, 14, 22 to two intermediate terms, sums 38S from each bit-position and carries 38C generated from each bit-position, using carry-save adder 32. Carry-save adder 32 does not propagate the carries but merely outputs these intermediate carries 38C. These intermediate carries 38C and sums 38S are then input to a 2-port full adder 34, which propagates internal carries and forms the final sum 24. A sign-extender 15 will optionally sign-extend a value on bus 13 before input to the adder 32 on input 14.

Figure 4:
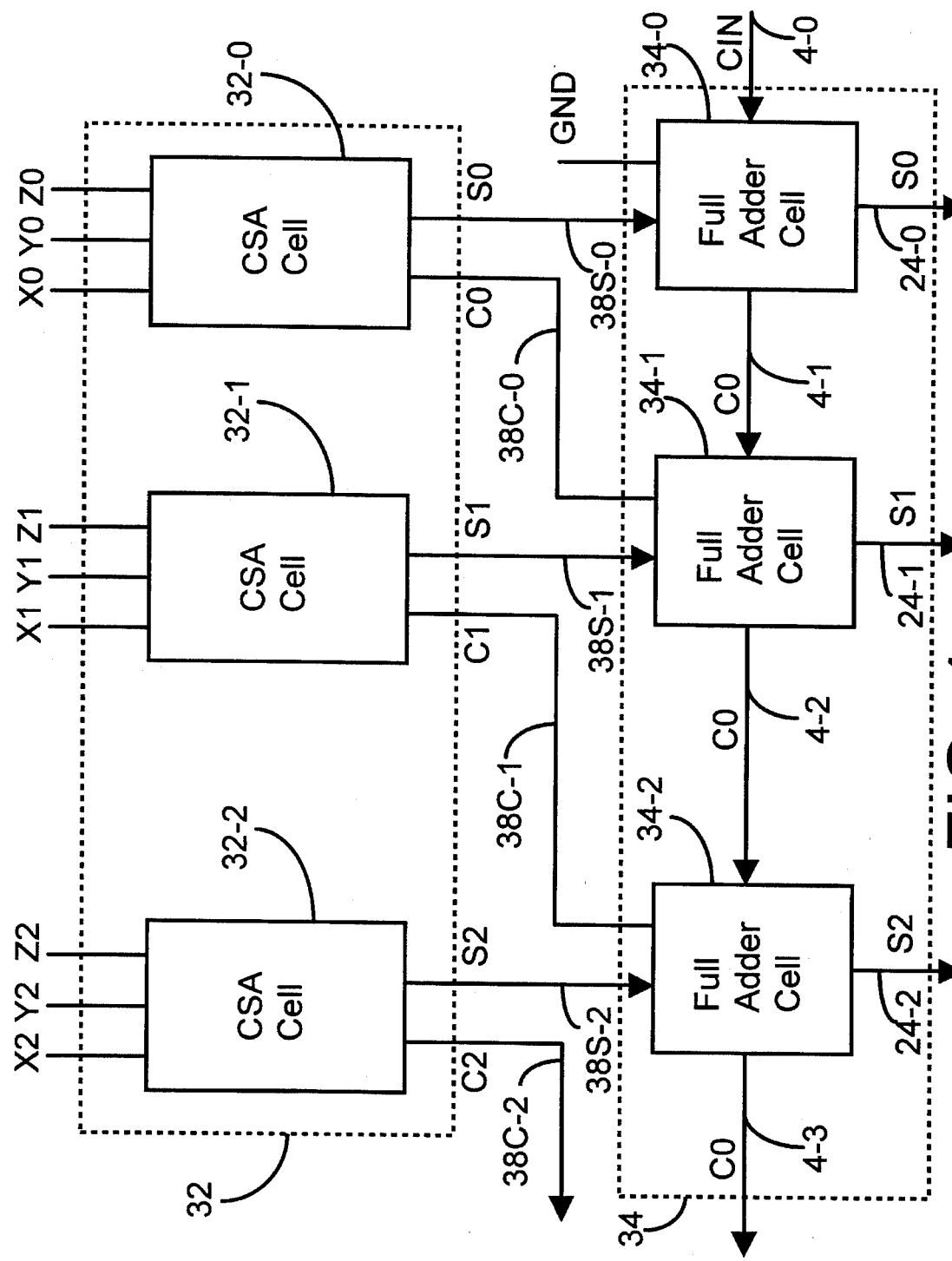
FIG. 4 illustrates a carry-save adder and a full adder.

FIG. 4 illustrates one implementation of adder cells making up the carry-save adder 32 and the full adder 34 of FIG. 3. Carry-save adder 32 comprises a plurality of carry-save adder cells 32-0, 32-1, 32-2 and other cells (not shown), one cell for each bit-position. Thus a 32-bit adder would have 32 carry-save adder cells 32-0, 32-1 . . . 32-31. Likewise full adder 34 comprises full adder cells 34-0, 34-1, 34-2, and other full adder cells (not shown), one cell for each bit-position. Thus 32 full adder cells 34-0, 34-1 . . . 34-31 would also be required for a 32-bit adder. However, for simplicity and clarity FIG. 4 only shows the first 3 adder cells of the 32 adder cells in carry-save adder 32 and full adder 34.

Each carry-save adder cell is connected in a similar fashion to carry-save adder cell 32-0, which has three inputs, X0, Y0, Z0, which are the bit-position zero bits from inputs 12, 14, 22, and produces two outputs, a sum output 38S-0 and a carry output 38C-0. Each input and output to carry-save adder cell 32-0 is one-bit wide. The sum output 38S-0 is calculated as the exclusive-OR of the three inputs X0, Y0, Z0 while the carry output 38C-0 is active high if any two of the three inputs X0, Y0, Z0 are high, or if all three inputs are high.

Full adder cells 34-0, 34-1, 34-2 are configured to propagate the carry terms 4-1, 4-2, 4-3 generated within full adder 34. Each full adder cell is coupled to receive a sum and a carry from the carry-save adder 32, and each full adder cell generates a single sum output 24-0, 24-1, 24-2. A third input to each full adder cell is a carry propagate signal 4-0, 4-1, 4-2 from the next least-significant full adder cell. The second output from each cell is a carry propagate output 4-1, 4-2, 4-3 to the next most-significant full adder cell. Thus carries may be propagated all the way up the full adder. The adders of FIG. 4 are preferably implemented in BiCMOS or ECL gates, as a carry-save adder and a ripple-carry adder, but many other implementations of a 3-port adder are possible within the spirit of the invention.

Figure 5:
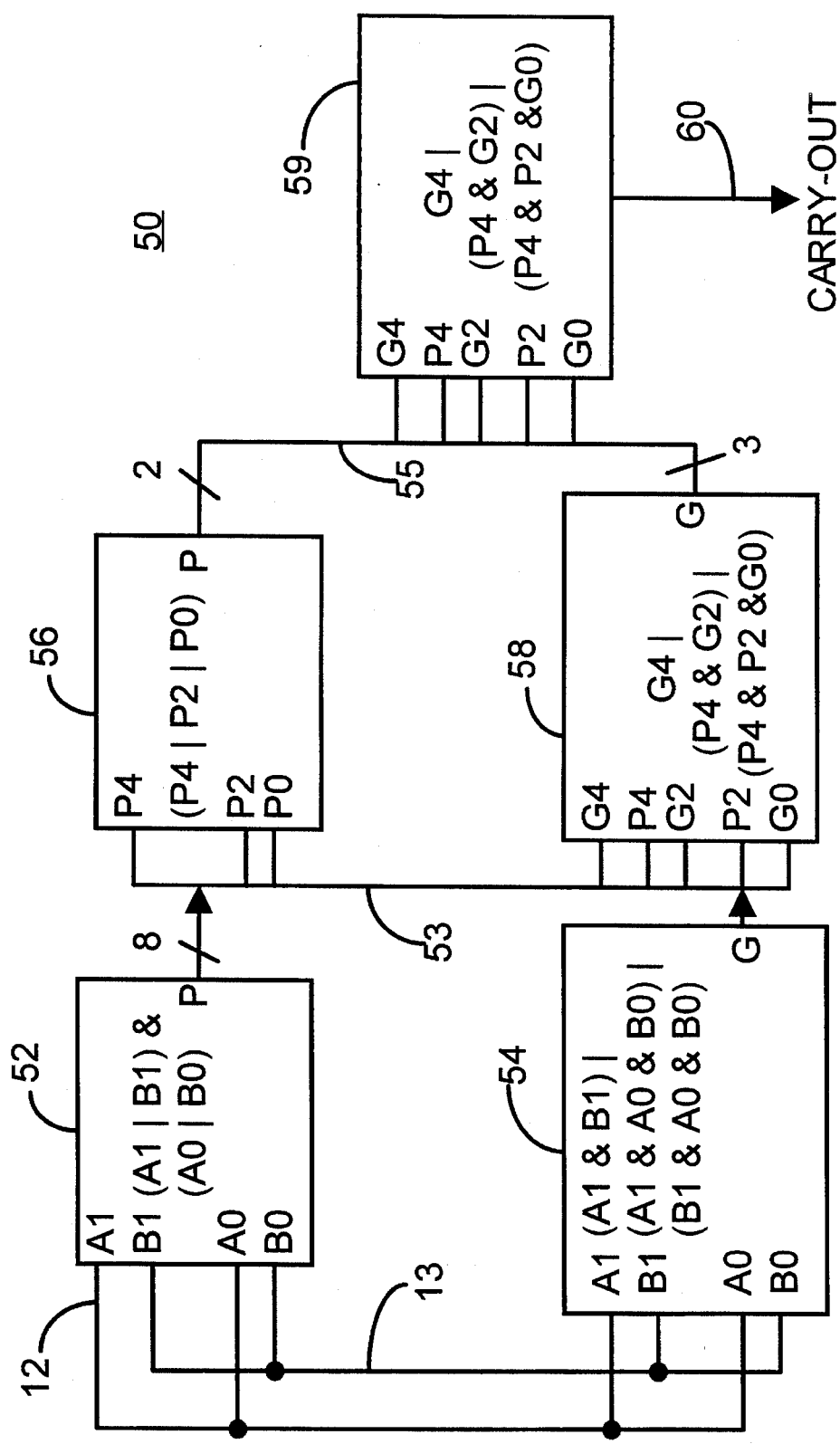
FIG. 5 is a look-ahead reduced-modulus carry generator.

FIG. 5 is a look-ahead reduced-modulus carry generator 50. Although similar to an adder, carry generator 50 does not produce a sum, but only a single output, a carry-out signal 60 from the highest bit-position. In the preferred embodiment, carry-out signal 60 is from the 16th bit-position, which is the width of the reduced-width address components. Reduced-width address components are input on busses 12 and 13, which are coupled to logic blocks 52, 54 which generate first-level generate and propagate signals 53, which are input to blocks 56, 58, generating second-level generate and propagate signals 55, which are then input to the final stage 59, which generates the carry-out signal 60.

Carry generator 50 is preferably implemented in BiCMOS or ECL gates, and generates the carry-out for the addition of the two 16-bit inputs, but many other implementations of a fast look-ahead carry generator are possible within the spirit of the invention.

Figure 6:
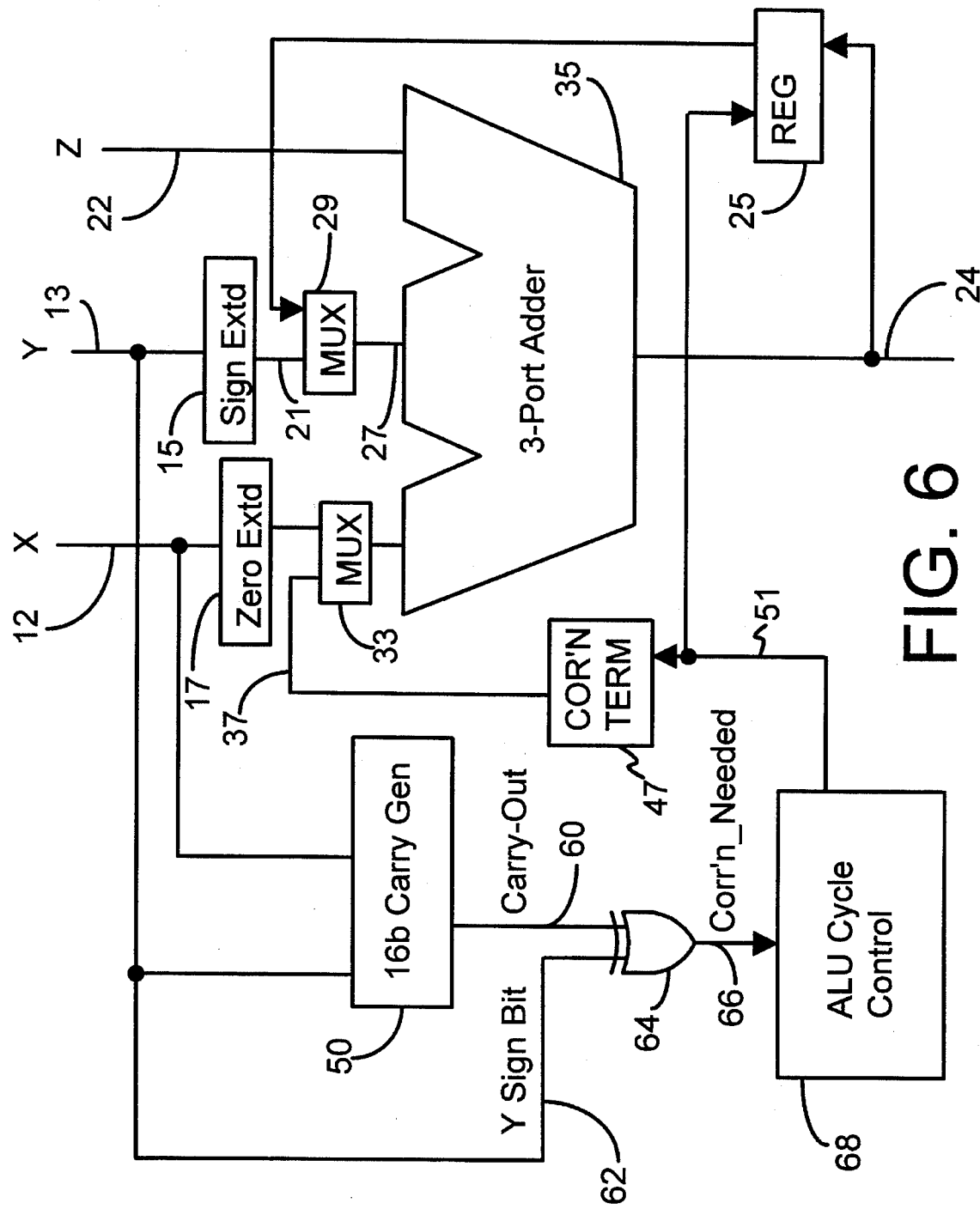
FIG. 6 illustrates an apparatus for mixed-modulus address generation.

FIG. 6 illustrates an apparatus for mixed-modulus address generation. Three-port adder 35, as described in reference to FIGS. 3 and 4, and carry-generator 50, described in reference to FIG. 5, cooperate to generate a linear address from address components that are input on busses 12, 13, and 22. In the preferred embodiment 16-bit reduced-width address components X, Y are input on busses 12, 13 while a 32-bit full-width address component Z is input on bus 22. Carry generator 50 receives components X, Y on busses 12, 13 and generates a carry-out signal 60 for the addition of the two 16-bit address components X, Y. The carry-out signal 60 is the carry-out that would be generated if components X and Y were added to each other in a 16-bit adder. However, the sum of X and Y is not computed. Three-port adder 35 is a 32-bit, full-width adder, computing the sum 24 of three 32-bit inputs. The third input on bus 22 is full-width and is input directly to adder 35. Components X and Y are only 16 bits and must be extended to 32-bit before being input to the adder. Component X on bus 12 is simply extended with zeros in the upper bits by extender 17 to produce a 32-bit zero-extended input to adder 35. Component Y on bus 13 may be a signed address component, representing either a positive or a negative number. A sign bit, which is preferably the most-significant (16th) bit in Y, determines if the component Y is a positive or a negative number. The sign bit is copied to the upper bits, bits 17 to 32, by sign-extender 15 to produce a 32-bit sign-extended input 21 to the adder 35.

When more than three address components must be added together, the three-port adder 35 must be used more than once. A recirculating path is provided to take the sum 24 from the adder 35 and recirculate it to one of the inputs to the adder 35. The sum 24 is stored in register 25 and then fed back to the second input 27 through multiplexer 29. On the subsequent step, a fourth address component may be added to the sum from the first step stored in register 25, to get a final sum for four address components. The fourth address component may be input to the adder through bus 22, if the component is a full-width address component, or the fourth address component may be input on bus 12 if the fourth component is a 16-bit reduced-width address component. Since four-component address computations are rare, it would not be cost-effective to extend adder 35 to four ports. However, other embodiments of the x86 architecture, or architectures other than x86, may benefit from an adder with four or more ports.

Since the recirculating path is needed for the rare four-address-component case, the path may also be used to correct a sum for the effect of the reduced modulus of the 16-bit reduced-width address components. The 16-bit carry generator 50 may be used to signal when an unexpected carry has occurred, indicating that the sum computed in adder 35 may be an incorrect sum, since the 16-bit address components X, Y were not added in the reduced modulus (64K for 16 bits), but in the full modulus (4G for 32 bits). A correction term 37 may be added to the sum 24 which is stored in register 25. This correction term 37 is added to the incorrect sum recirculated from register 25 in a subsequent calculation step. The incorrect sum is input through multiplexer 29 to the second input 27, while the correction term 37 is input over bus 12 through mux 33. Input Z on bus 22 is set to zero.

Correction term 27 could also be input over bus 22, with input X set to zero. Alternatively, the correction term could be split up into two pieces, one on each of busses 12, 22, which when added together would yield the correction term.

The sign bit 62 of address component Y is preferably the most-significant bit, bit 16, of the 16-bit reduced-width address component Y which is input on bus 13. This sign bit 62 is input to exclusive-OR gate 64, along with the carry-out signal 60 from carry generator 50. The output of exclusive-OR gate 64 is a correction needed signal 66, which indicates to the ALU cycle control logic 68 that the sum 24 is not correct and must be modified by a correction term in a subsequent cycle. ALU cycle control logic 68 controls the sequencing of cycles and controls the muxing and inputting of data into the 3-port adder 35. ALU cycle control 68 signals on line 51 that the correction term 37 is to be generated from logic block 47, and that register 25 recirculate the incorrect sum 25 when a subsequent calculation step is needed for correcting the sum 25.

Address generation using all 32-bit full-width components can also be accomplished in the 3-port adder by simply disabling the sign-extender 15 and disabling the correction needed signal 66. An additional logic gate (not shown) can disable the correction needed signal 66 when only full-width address components are used.

When doing arithmetic in the reduced modulus, the reduced-width address components can be either signed or unsigned. Signed and unsigned components behave in the same manner because there are no carries into higher-order bit-positions that are greater than the reduced modulus. No sign-extension or zero-extension is necessary. While any particular reduced-width address component may be signed or unsigned, the arithmetic result using the reduced modulus is the same regardless of whether the component is signed or unsigned. A key feature of the invention is that when a full-modulus adder is used for reduced-modulus addition, one of the reduced-width address components is treated as an unsigned value while another reduced-width address component is treated as a signed value. The detailed description will refer to one reduced-width address component as an unsigned component while referring to another reduced-width address component as a signed component, although the components themselves are interchangeable from the architectural point-of-view.

Note that component Y on bus 13 does not have to be a signed component in all embodiments of the invention. However, component Y is treated as a signed component. Similarly, component X on bus 12 may be a signed component even though it gets treated as an unsigned component by being zero-extended. The invention sign extends one of the two reduced-width address components. This invention assumes that addition with a negative sign-extended component will generate a carry-out, while addition with a positive sign-extended component will not generate a carry-out. These assumptions will be correct a majority of the time, resulting in fewer additions of the correction term than if the sign-extension was not performed and the correction term was added every time the carry-out occurred. A proper choice of which address components to place as component Y on bus 13 will require that the correction term be added in only infrequently. For example, the displacement is often negative, and it is a good choice for the Y component.

OPERATION OF THE INVENTION

The correction term must be added when a reduced-modulus carry-out is signaled by the carry generator 50 when address component Y is a positive number. This indicates that an address wrap-around has occurred in the sum of the two 16-bit address components. Since a carry-out of the 16th bit has occurred, which has the value of $2^{16}$ or 64K, the carry-out can be removed from the 32-bit sum 24 by subtracting $2^{16}$. Thus the correction term to be added is the negation or two's complement of $2^{16}$. Table 1 shows some examples, where 16-bit component X is added to 16-bit component Y, and both X and Y are positive numbers. All numbers are in hexadecimal format.

TABLE 1

| | | Correction Term when Y is Positive | | | |
|---|---|---|---|---|---|
| X | Y | $16^b$ Carry | $16^b$ Sum | $32^b$ Sum | Correction Term |
| 0x0000 | 0x0000 | 0 | 0x0000 | 0x00000000 | 0 |
| 0xFFFF | 0x0000 | 0 | 0xFFFF | 0x0000FFFF | 0 |
| 0xFFFF | 0x0001 | 1 | 0x0000 | 0x00010000 | 0xFFFF0000 |
| 0x7FFF | 0x0000 | 0 | 0x7FFF | 0x00007FFF | 0 |
| 0x7FFF | 0x7FFF | 0 | 0xFFFE | 0x0000FFFE | 0 |
| 0x9000 | 0x700B | 1 | 0x000B | 0x0001000B | 0xFFFF0000 |

The correction term, 0xFFFF0000, is the two's complement of 0x00010000, or $2^{16}$. Thus the correction term is equivalent to subtracting $2^{16}$. When address component Y is a negative number, sign-extending the 16-bit component Y to 32-bits has the effect of subtracting $2^{16}$. For example, the 16-bit number representing −5, is 0xFFFB in hexadecimal (the two's complement of 5). Zero-extending this to 32-bits yields 0x0000FFFB, which is the number 64K−5 in the 32-bit modulus. Prior-art systems would zero-extend a reduced-width component in this way. However, in the present invention, the Y component is not zero-extended but sign-extended to 32-bits, even though this changes the effective value. Hardware to sign-extend to 32 bits is already present in most implementations because of the need to extend short constants to 32 bits. Sign extending 0xFFFB to 32 bits yields 0xFFFFFFFB, which is the 32-bit number −5. When a 32-bit number is added to the extended Y component, the difference is apparent:

| +5 | 0x0005 | 0x0005 |
|---|---|---|
| −5 | 0xFFFB | 0xFFFB |
| | Zero-extend | Sign-Extend |
| −5 | 0x0000FFFB | 0xFFFFFFFB |
| Add Z = 1 Meg | 0x00100000 | 0x00100000 |
| Result | 0x0010FFFB | 0x000FFFFB |
| Decimal | 1Meg + 64K − 5 | 1 Meg − 5 |

Zero-extension gives the desired result, which is that the address wraps-around to 5 below the top of the 64K address block, at address 64K−5. However the sign-extended result can be corrected by adding the modulus, 64K. Because of this difference between zero-extension and sign-extension, a correction term of 64K or $2^{16}$ must be added to the sum when component Y is a negative number. However, if a carry-out of bit-position 16 is also signaled by carry generator 50, then a correction term of $2^{16}$ must be subtracted from the sum. This cancels out the correction for the negative sign-extension of Y. Thus when Y is negative and a carry out is signaled, no correction is needed. Negative values for reduced-width address component Y only need a correction term when there is not a carry-out signaled from carry generator 50.

Table 2 shows some examples when address component Y is negative. The correction term, $2^{16}$ is the inverse of the correction term when Y is positive, which Table 1 showed as $-2^{16}$.

TABLE 2

| | | Correction Term when Y is Negative | | | | | |
|---|---|---|---|---|---|---|---|
| X | Y | $16^b$ Carry | $16^b$ Sum | $32^b$ Extended Y | $32^b$ Sum | | Correction Term |
| 0x0001 | 0xFFFF | 1 | 0x0000 | 0xFFFFFFFF | 0x00000000 | | 0 |
| 0x7FFF | 0x8000 | 0 | 0xFFFF | 0xFFFF8000 | 0xFFFFFFFF | | 0x00010000 |
| 0x7FFF | 0x8001 | 1 | 0x0000 | 0xFFFF8001 | 0x00000000 | | 0 |
| 0xFFFF | 0x8000 | 1 | 0x7FFF | 0xFFFF8000 | 0x00007FFF | | 0 |
| 0x7FFF | 0xFFFF | 1 | 0x7FFE | 0xFFFFFFFF | 0x00007FFE | | 0 |
| 0x9000 | 0x800B | 1 | 0x100B | 0xFFFF800B | 0x0000100B | | 0 |
| 0x0005 | 0xF000 | 0 | 0xF005 | 0xFFFFF000 | 0xFFFFF005 | | 0x00010000 |

X86 ADDRESSING AND ADDRESS COMPONENTS

The x86 architecture is a complex instruction set computer (CISC) and hence address generation can be complex. The program or effective address is defined as the sum of one or more address components, which are reduced-width in some modes. The linear address is the effective address added to the 32-bit full-width segment base address. The x86 architecture defines the following address components:

base index displacement segment base.

The segment base is always a positive number, of full width (32-bits). The other components can be reduced-width, or 16-bits. The base is always a positive, unsigned number. However, the displacement is always a signed (negative or positive) number, and the index can be either signed or unsigned.

Figure 7:
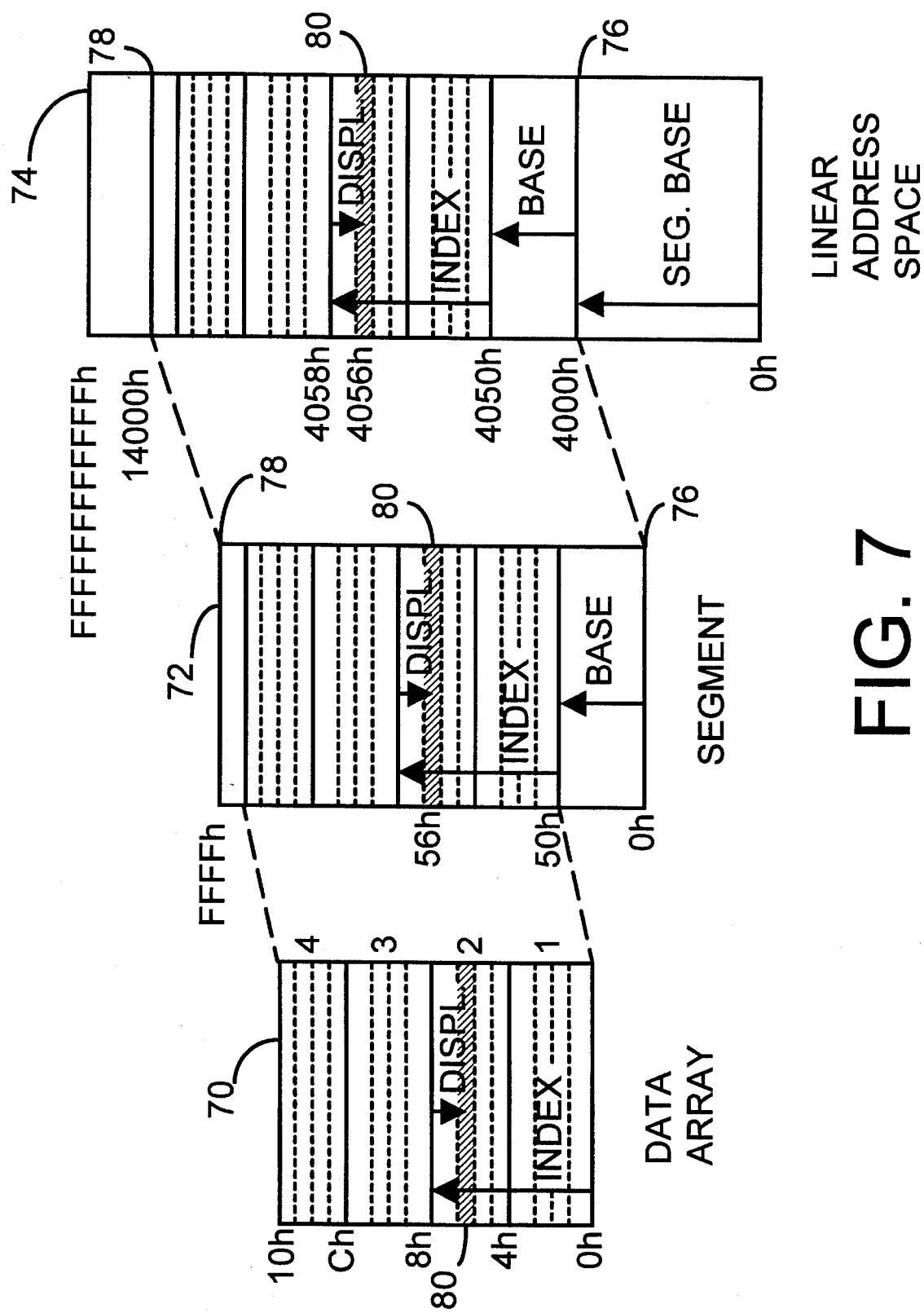
FIG. 7 shows a data array structure stored in memory in the virtual address space and in the linear address space.

FIG. 7 shows a structured data array 70 stored in memory. Data array 70 contains 4 items, with each item occupying 4 address locations. A desired byte 80 within the data array 70 may be accessed by specifying an index and displacement. The location of the data array 70 must also be specified by the base address component. The index specifies the data item, while the displacement specifies the address relative to the upper address in the item, in this particular example. Thus the third address of item 2 may be specified with an index of 8 (2 items ×4 addresses/item), and a displacement of −2. Many different ways of structuring data arrays using base, index, and displacements will be obvious to one skilled in the art and still fall within the spirit of the invention.

FIG. 7 also shows the data array 70 in the virtual address space or segment 72 and in the linear address space 74. Segment 72 is 64K bytes in size, extending from the segment base address 76 to the segment upper bound 78. The third byte of the second item in data array 70, the desired byte 80, is specified within the segment 72 as the sum of the base, index, and displacement address components. Within the effective address space or segment 72, the segment base 76 has address 0.

Segment 72 containing data array 70 is also shown in the linear address space 74. The entire segment 72 contains 64K bytes. Segment base address 76 has the value 4000 hex and corresponds to virtual address 0. Thus the segment base address component has the value 4000 hex. The upper bound 78 of the segment has a linear address of 4000+64K, or 14000 hex, since 64K is 10000 hex. Thus the linear address of the desired byte 80 in data array 70 in segment 72 is 4056, and is calculated as:

base + index + displacement + segment base address

50 + 8 + −2 + 4000 .

Note that the segment base address 76 and the base address component are two different address components. In this example, segment base address 76 has the value 4000 and is a 32-bit value, while the base has the value 50 and is a 16-bit address component.

IMPLEMENTATION OF X86 ADDRESSING MODES

Several x86 addressing modes exist from the combinations of base, index, and displacement address components. All of these components are not always present for any given address calculation. However, the 32-bit segment base address is always present. The index may also be multiplied by a constant (such as a scaling factor) before being input to the adder by a simple bit-shift, which is a well-known technique in the art and is therefore not shown.

The 3-port adder 35 of FIG. 6 has three ports, the X port 12, which zero-extends 16-bit components, the Y port 13, which has the sign-extender 15 for sign-extending 16-bit components, and the Z port 22 for 32-bit components. Reference will be made to ports X, Y, and Z in implementing the various x86 addressing modes.

The simplest case is when only a single one of the three reduced-width address components, base, index, displacement, are present. The one reduced-width address component is input to the zero-extended port X of the 3-port adder, while a zero is applied to the Y input, and the full-width 32-bit segment base address is input to the third port, Z. Sign-extending the applied zero to the Y port has no effect on the sum. The one reduced-width address component may alternately be applied to the Y port and sign-extended, while a zero is applied to the X port. In this case, a correction term may be needed if the one reduced-width address component has a negative sign bit. The correction term would have to be added in during a subsequent step, requiring that at least one more clock period be used. An alternate approach, the preferred one if the Y port is being used for a single address component, is to disable the sign-extension of the one reduced-width address component on the Y port, thus the correction term would not be needed for canceling the sign-extension. Since only one 16-bit address component is being input to the 3-port adder, a reduced-modulus carry-out cannot occur. Thus a correction would not be needed in these cases as long as a negative Y component is not sign-extended. Table 3 shows these cases with only one 16-bit component. Base and index modes could also input the base or index components on port Y instead of port X, as is shown for displacement mode.

TABLE 3

Modes with only one 16-bit Address Component

| Address Mode | X | Y | Z | Notes |
|---|---|---|---|---|
| Base | Base | 0 | seg. base addr | |
| Index | Index | 0 | seg. base addr | |
| Base | 0 | Base | seg. base addr | |
| Index | 0 | Index | seg. base addr | |
| Displacement | Displacement | 0 | seg. base addr | |
| Displacement | 0 | Displacement | seg. base addr | disable sign-extend |

Table 4 shows address modes that use two of the three reduced-width address components. All three ports of the 3-port adder are used since the segment base address is input on port Z. In base+index mode, the base is input to port X. Since the base is always an unsigned positive number, the base is merely zero-extended to 32-bits. The index is sign-extended to 32-bits and input on port Y and added to the base on port X and the segment base address on port Z.

In base+displacement mode, the displacement is input on port Y and sign-extended. In the index+displacement mode, the index is zero-extended rather than sign-extended since it is input on port X which does not sign-extend as does port Y. However, since the 16-bit index is to be added in modulo 64K, a zero-extension is proper since it is defined by the architecture. Thus no correction is necessary for the index on the X port. However, the displacement may be a negative number that when sign-extended requires a correction. This correction may be used to cancel out the correction required by the reduced-modulus carry-out, or an explicit correction term may need to be added in a subsequent step. A correction may also be necessary if signaled by the 16-bit carry out, and the Y input has a sign bit indicating a positive number.

ment, and the segment base address, at least two steps or cycles through the 3-port adder are necessary. The first step is shown in the first row of Table 5, where the index on port X is added to the sign-extended displacement on port Y, while a zero is input to the Z port. While the correction term could be added in a subsequent step if required, an alternate method is to cancel any carry-out generated by a positive Y. This may be simply done by modifying the sum output from the 3-port adder in the first step. The sum bit in bit-position 17 is copied to bit-position 16. Thus if the sum is negative, both bits 16 and 17 will be one's, and the copying will have no effect. Likewise if the sum is positive and no reduced-modulus carry-out occurred, then bits 16 and 17 will both be zero, and the copying will have no effect. However, if the sum is positive and a reduced-modulus carry-out occurred, then bit 17 will be zero but bit 16 will be one. Thus copying bit 17 to bit 16 will cancel the carry-out, effectively truncating the result. This copying can usually be performed at a point in the recirculating path which is not speed critical. Note that the sum from the first step after copying is a sign-extended 32-bit value.

In the second step, the 32-bit sum from the first step is input on port Y as a 32-bit number, so no further sign-extension is needed. Another reduced-modulus carry-out can occur in the second step if the base on port X added to the sum on port Y from first step is equal to or exceeds 64K, the reduced modulus. In that case, a correction term is added to the sum from the second step in a subsequent step, which would be a third step as shown in Table 5. The correction term is added when the reduced-modulus carry-out occurs and the sign bit on port Y, the first-step sum, is positive, or when no reduced-modulus carry-out occurs but the sign bit is negative.

TABLE 4

Modes with two 16-bit Address Components

| Address Mode | X | Y | Z | Notes |
|---|---|---|---|---|
| Base + Index | Base | Index | seg. base addr | Treat Index as Signed |
| Base + Displ. | Base | Displacement | seg. base addr | |
| Index + Displ. | Index | Displacement | seg. base addr | |

MULTIPLE-STEP ADDRESS GENERATION

Table 5 shows the final mode, when all three reduced-width address components are present. Since four components must be added together—the base, index, displace-

TABLE 5

Mode with all three 16-bit Address Components

| Address Mode | X | Y | Z | Notes |
|---|---|---|---|---|
| Base + Index + Displacement | Index | Displacement | 0 | Step 1 |
| Correction | Base Corr'n Term | step 1 sum step 2 sum | seg. base addr 0 | Step 2 Only if corr'n needed |

A preferred method shown in Table 6 for the base+index+displacement address mode is to add the base, displacement, and index on ports X, Y, and Z in the first step. Sign-extension need not be performed. The sum from this first step is simply truncated to 16 bits. No correction term is needed since the result is truncated to 16-bits, accomplishing the effect of the modulo-64K addition. In the second step, the truncated first-step sum is recirculated to either port X or Y, and the segment base is input on port Z. Thus only two steps are needed, and the correction term is never added in the base+index+displacement address mode.

TABLE 6

Preferred Mode with all three 16-bit Address Components

| Address Mode | X | Y | Z | Notes |
|---|---|---|---|---|
| Base + Index + Displacement | Base | Displacement | Index | Step 1 |
|  | 0 | step 1 Sum Truncated | seg. base addr | Step 2 |

SUBSEQUENT STEP FOR ADDING CORRECTION TERM

A correction term may need to be added when two or three reduced-width address components are added together, as in Tables 4 and 5. This correction term is added when a reduced-modulus carry-out is signaled from carry generator 50 of FIG. 6 and the sign bit of the address component on port Y indicates a positive number. The correction term is also needed when no carry-out is signaled, but a sign-extension of a negative number is performed on the input to port Y.

The correction term, either 0xFFFF0000 or 0x00010000, is input on either port X or port Z, while the incorrect sum from the previous step is recirculated on port Y. The 3-port adder outputs the final, corrected sum, which is the linear address. The exact coupling of the recirculated sum, the correction term, and the address components to the ports X, Y, and Z can be varied by persons with skill in the art within the teachings and spirit of this invention.

ALTERNATE EMBODIMENTS

Several other embodiments are contemplated by the inventors. For example the invention should not be restricted to the three-port adder described, but could be implemented in larger multi-port adders or in simple 2-port adders. Polarities of sign extensions or inputs could be reversed. Active low signals could be employed rather than the active high signals herein described. Computation could require several clock cycles or only a fraction of a clock cycle. Many implementations of the logic required for the adder and other functions are possible. The exact number of bits in the adder may vary because of architectural modifications. The detailed description has described an implementation using a ripple carry; other implementations such as carry-propagate/generate may also be used and are common in the prior art.

While the invention has been described in reference to address generation using reduced-width address components, the invention may also be employed for other arithematic operations besides address generation. Although modulus addition has been described, other modulus operations such as division, multiplication, or subtraction could also use the teachings of this invention wherein a subset of inputs require that a modulus arithemetic operation be performed on them.

While the invention has been described with reference to 16-bit reduced modulus address components in the context of the 32-bit x86 architecture, persons skilled in the art can apply the teachings of this invention to other moduli and architectures such as 64-bit RISC architectures.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A mixed-modulo adder for adding together an unsigned reduced-width binary number and a signed reduced-width binary number in a reduced modulus, while further adding in a full-width binary number in a full modulus, the mixed-modulo adder comprising:

sign-extend means, receiving the signed reduced-width binary number, for extending the signed reduced-width binary number to a full width, the sign-extend means outputting an extended binary number having the full width;

a multi-port adder, receiving as inputs the unsigned reduced-width binary number after being zero-extended, the extended binary number, and the full-width binary number, the multi-port adder calculating a full-modulus sum of the inputs received; and reduced-modulus carry generator means, receiving the unsigned reduced-width binary number and the signed reduced-width binary number, for producing a reduced-modulus carry-out, the reduced-modulus carry generator means including means for inputting a correction term to the multi-port adder during a subsequent step in response to the reduced-modulus carry-out and a sign bit, the correction term being added to the full-modulus sum, the correction term being an adjustment to the full-modulus sum to compensate for the effect of the sign-extend means and addition of the reduced-modulus binary numbers;

whereby full-modulus addition is performed on reduced-width binary numbers by sign-extension and addition of the correction term during the subsequent step when signaled by the reduced-modulus carry-out arid the sign bit.

2. The mixed-modulo adder of claim 1 wherein the signed reduced-width binary number has a sign bit, the sign bit indicating if the signed reduced-width binary number represents a positive or a negative number;

the sign-extend means extends the signed reduced-width binary number to the full width by copying the sign bit to upper bit-positions in the full width, the upper bit-positions being bit-positions not present in a reduced width; and the reduced-modulus carry generator means inputting a correction term to the multi-port adder during the subsequent step if a sum of the unsigned reduced-width binary number and the signed reduced-width binary number is equal to or exceeds the reduced modulus when the signed reduced-width binary number is treated as a positive number, the full-modulus sum being turned to one of the inputs of the multi-port adder for use in the subsequent calculation step.

3. The mixed-modulo adder of claim 2 wherein the full width is 32 bits and the full modulus is 4 G, while the reduced width is 16 bits and the reduced modulus is 64K.

4. The mixed-modulo adder of claim 2 wherein the multi-port adder is comprised of a carry-save adder and a full adder, the full adder capable of generating and propagating intermediate carry terms.

5. The mixed-modulo adder of claim 2 further comprising means for extending the unsigned reduced-width binary number to the full width including means for copying zeros to the upper bit-positions before the unsigned reduced-width binary number is input to the multi-port adder.

6. The mixed-modulo adder of claim 2 wherein the multi-port adder has three full-width input ports.

7. The mixed-modulo adder of claim 2 wherein the subsequent step occurs and the correction term is input to the multi-port adder if the sign bit indicates a positive number and the reduced-modulus carry-out is signaled, or if the sign bit indicates a negative number and the reduced-modulus carry-out is not signaled.

8. The mixed-modulo adder of claim 7 wherein the correction term is the reduced modulus when sign bit indicates a negative number and the reduced-modulus carry-out is not signaled, and wherein the correction term is the two's complement of the reduced modulus when the sign bit indicates a positive number and the reduced-modulus carry-out is signaled.

9. The mixed-modulo adder of claim 2 wherein a linear address is:

(i) the full-modulus sum, when the correction term is not input to the multi-port adder in the subsequent step;

(ii) the full modulus sum after being corrected in the subsequent step, when the correction term is input to the multi-port adder.

10. A mixed-modulo adder for adding together a first reduced-width address component having a reduced width and a second reduced-width address component in a reduced modulus, while further adding in a full-width address component in a full modulus having a full width, the second reduced-width address component having a sign bit indicating if the second reduced-width address component is treated as a positive or a negative number, the mixed-modulo adder comprising:

sign-extend means, receiving the second reduced-width address component, for extending the second reduced-width address component to the full width by copying the sign bit to a plurality of upper bit-positions in the full width, the plurality of upper bit-positions being bit-positions not present in the reduced width, the sign-extend means outputting an extended address component having the full width;

a multi-port adder, receiving as inputs the first reduced-width address component after being zero-extended, the extended address component, and the full-width address component, the multi-port adder calculating a full-modulus sum of the inputs received;

recirculating means, receiving the full-modulus sum from the multi-port adder, for returning the full-modulus sum to one of the inputs of the multi-port adder for use in a subsequent calculation step;

reduced-modulus carry generator, receiving the first reduced-width address component and the second reduced-width address component, the reduced-modulus carry generator producing a reduced-modulus carry-out if a sum of the first reduced-width address component and the second reduced-width address component is equal to or exceeds the reduced modulus when the second reduced-width address component is treated as positive number; and correction term input means, responsive to the reduced-modulus carry-out and the sign bit, for inputting a correction term to the multi-port adder during a subsequent step, the correction term being added to the full-modulus sum from the recirculating means, the correction term being an adjustment to the full-modulus sum to compensate for the effect of sign extension and addition of the reduced-modulus address components; whereby full-modulus addition is performed on reduced-width address components by sign-extension and addition of the correction term during the subsequent step when signaled by the reduced-modulus carry-out and the sign bit.

11. The mixed-modulo adder of claim 10 wherein the full width is 32 bits and the full modulus is 4 G, while the reduced width is 16 bits and the reduced modulus is 64K.

12. The mixed-modulus adder of claim 10 further comprising means for extending the first reduced-width address component to the full width including means for copying zeros to the upper bit-positions before the first reduced-width address component is input to the multi-port adder.

13. The mixed-modulo adder of claim 10 wherein the multi-port adder has three full-width input ports.

14. The mixed-modulo adder of claim 10 wherein the subsequent step occurs and the correction term is input to the multi-port adder if the sign bit indicates a positive number and the reduced-modulus carry-out is signaled, or if the sign bit indicates a negative number and the reduced-modulus carry-out is not signaled.

15. The mixed-modulo adder of claim 14 wherein the correction term is the reduced modulus when sign bit indicates a negative number and the reduced-modulus carry-out is not signaled, and wherein the correction term is the two's complement of the reduced modulus when the sign bit indicates a positive number and the reduced-modulus carry-out is signaled.

16. A computer-implemented method for adding a first and a second address component to a third address component in a full-width adder on a central processing Unit (CPU), the first and second address components having a reduced width, the third address component having a full width, the first, second, and third address components each being represented by a plurality of signals on a bus, the second address component having a sign bit signal, the method comprising:

sign-extending the second address component by copying the sign bit signal to additional bit-positions in the full width but not in the reduced width, producing a sign-extended second address component on a full-width bus;

generating in the full-width adder on the central processing unit the full-width sum of (a) the first address component after being zero-extended, (b) the sign-extended second address component, and (c) the third address component in a full-width adder;

outputting the full-width sum generated by the full-width adder onto a full-width bus on the central processing unit;

determining in a reduced-modulus carry generator means on the central processing unit if a partial sum of the first address component and the second address component is equal to or exceeds a reduced modulus;

generating a reduced-modulus carry-out signal if the partial sum is equal to or exceeds the reduced modulus; and adding a correction term to the full-width sum if the sign bit signal indicates a positive value and the reduced-modulus carry-out signal is generated, or if the sign bit signal indicates a negative value and the reduced-modulus carry-out signal is not generated.

17. The computer-implemented method of claim 16 further comprising:

adding a fourth address component to the full-width sum before adding the correction term.

18. The computer-implemented method of claim 16 wherein the third address component is a segment base address.

19. The computer-implemented method of claim 18 wherein the first and second address components are specified by a user program while the segment base address is specified by an operating system.

20. The computer-implemented method of claim 19 wherein the first and second address components are selected from the group consisting of a base address, an index address, and a displacement.

21. The computer-implemented method of claim 20 wherein the index address is shifted in the central processing unit before the full-width sum is generated, the number of bits the index address is shifted being determined by a scaling factor.

22. A mixed-modulo adder for adding together a subset of inputs in a reduced modulus, while further adding to the subset of inputs a full-width binary number in a full modulus, the mixed-modulo adder comprising:

a multi-port adder, receiving as inputs the subset of inputs in a reduced modulus and the full-width binary number, the multi-port adder calculating the full-modulus sum of the subset of inputs after being extended and the full-width binary number;

recirculating means, receiving the full-modulus sum from the multi-port adder, for returning the full-modulus sum to one of the inputs of the multi-port adder for use in a possible subsequent calculation step;

reduced-modulus carry generator, receiving the subset of inputs in a reduced modulus, the reduced-modulus carry generator producing a reduced-modulus carry-out if a sum of the subset of inputs in a reduced modulus is equal to or exceeds the reduced modulus; and correction term input means, responsive to the reduced-modulus carry-out, for inputting a correction term to the multi-port adder during the possible subsequent calculation step, the possible subsequent calculation step occurring if the reduced-modulus carry-out is signaled but the possible subsequent calculation step not occurring if the reduced-modulus carry-out is not signaled, the correction term being added to the full-modulus sum from the recirculating means in the possible subsequent calculation step, the correction term for being an adjustment to the full-modulus sum to compensate for the effect of addition of the subset of inputs in a reduced modulus;

whereby full-modulus addition is performed on a subset of inputs by addition of the correction term during the possible subsequent calculation step when signaled by the reduced-modulus carry-out.

* * * * *